May 7, 1946.  A. C. KORTE  2,400,008

METHOD OF FORMING COILS

Filed July 14, 1943

INVENTOR.
ALFRED C. KORTE

George R. Ericson
ATTORNEY

Patented May 7, 1946

2,400,008

UNITED STATES PATENT OFFICE 2,400,008

METHOD OF FORMING COILS

Alfred C. Korte, St. Louis, Mo., assignor to Carter Carburetor Corporation, St. Louis, Mo., a corporation of Delaware Application July 14, 1943, Serial No. 494,899

1 Claim. (Cl. 171—252)

This invention relates to the winding and mounting of magnetic coils and particularly the field coils of small electric motors.

In winding the field coils of electric motors, and particularly those of the smaller type, it has been customary to tie together the coil strands with pieces of twine before removal from the winding spindle, and then to insert unbound portions of the coil into the receiving slots of the field frame or core. Flexible insulating material, which has been first inserted into each slot, is wrapped about the coil strands and the ends thereof lodged between the coil and the edges of the slot. The binding twine is then removed. The insertion of the loose strands into the slots is difficult and, furthermore, the insulating material is not firmly held in position. These difficulties are enhanced in small motors due to the fine wire used in the coils and the small size of the core frames and slots which make the use of inserting tools difficult.

The main object of the present invention is to provide a method for facilitating and simplifying the formation and mounting of such coils.

A more detailed object is to facilitate the insertion of the coil strands into the core slots and eliminate the extra coil ties, customarily provided, which have no insulating function.

These objects and other more detailed objects hereafter appearing are attained substantially by the method and means illustrated in the accompanying drawing in which.

Figure 1:
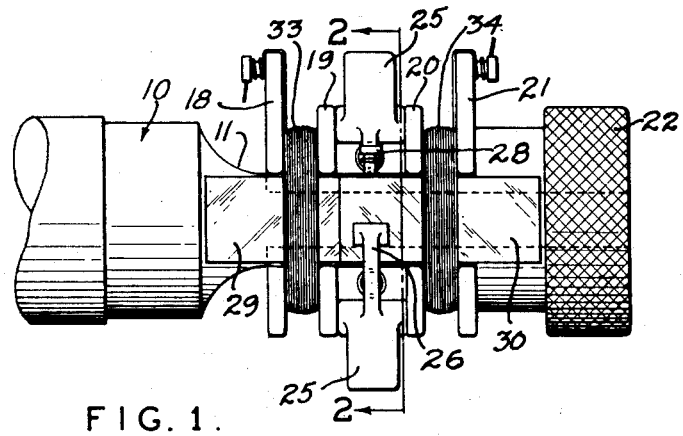
Fig. 1 is a top view of a coil winding spindle having a pair of coils wound thereon.
Figure 2:
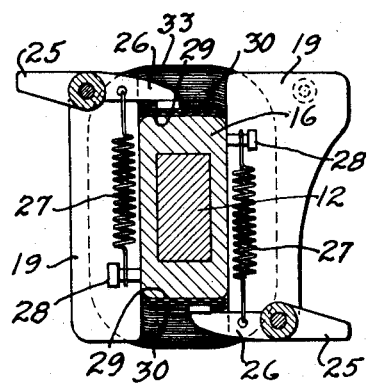
Fig. 2 is a vertical section on line 2—2 of Fig. 1.
Figure 3:
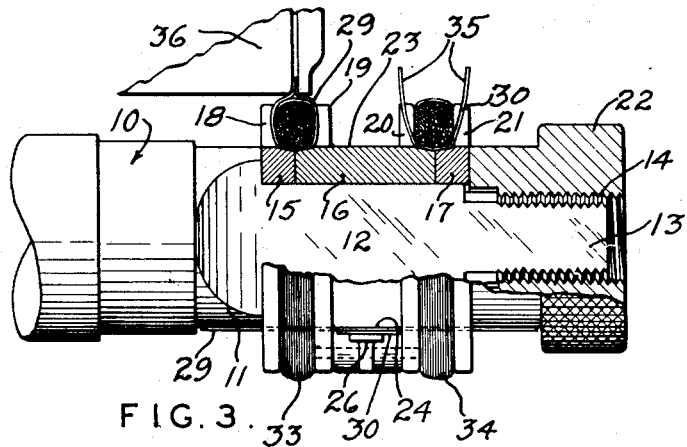
Fig. 3 is a view similar to Fig. 1, but partly sectioned on the longitudinal center line of the spindle to better illustrate the application of the insulating ties.
Figure 4:
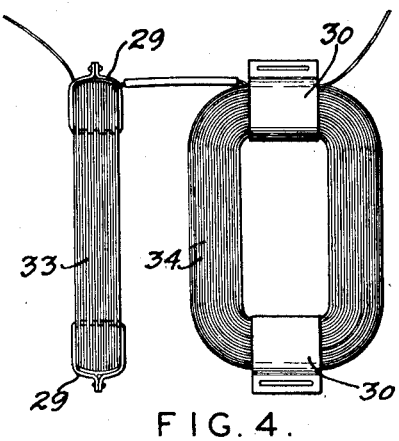
Fig. 4 is a view of the coils removed from the spindle.

Figs. 1, 2 and 3 show a spindle 10 arranged for rotation by a power source and having reduced portions 11, 12 and 13, the latter being threaded as at 14. Slidable on the rectangular intermediate portion 12 and rotatable therewith is a coil winding head comprising three separate parts, 15, 16, 17, having radial ribs 18, 19, 20 and 21 for receiving the windings of the coils therebetween. The head is secured in position by a knurled knob 22 threaded on spindle part 13 so as to be readily applied and removed by the operator. When the knob is unscrewed, head parts 15, 16 and 17 may be withdrawn and separated to permit removal of the coils wound thereon.

Flat surfaces 23 and 24 are provided, respectively, on the top and bottom of the winding head between ribs 18, 19, 20 and 21 and these surfaces are extended onto spindle part 11 and knob 22. Pivoted between inner ribs 19 and 20 are a pair of holding devices each having an outwardly projecting thumb portion 25 and an inward finger 26. Tension springs 27, each anchored at one end to a pin 28 projecting from the winding head, urge the holding devices against surfaces 23 and 24.

When the head is secured in position, and before winding the coils, a pair of strips 29 and 30 of flexible, insulating material, such as heavy paper, are laid upon each of the flat surfaces 23 and 24 with their inner ends overlapping and secured beneath holding fingers 26. Surfaces 23 and 24 are, preferably, of such size as to properly center the strips.

Figure 6:
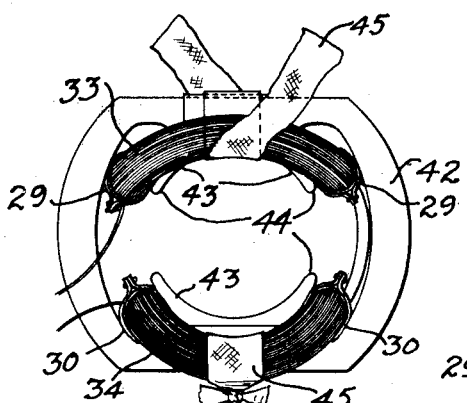
Fig. 6 shows the coils applied to a motor field supporting frame or core.
Figure 5:
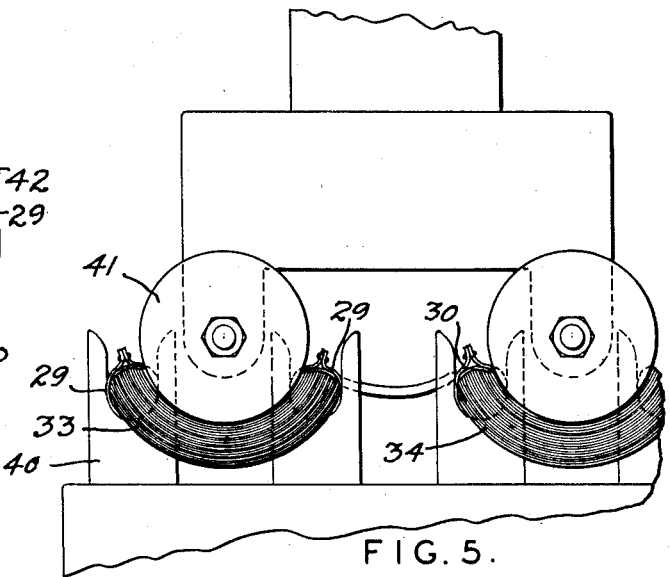
Fig. 5 shows the coils applied to a shaping device.

After the insulating strips are applied to the winder, the coils 33 and 34 are wound in series, as shown in Fig. 1. When the winding is completed, the insulating strips are released from the holding devices by pressure on thumb projections 25 and flexed upwardly, as indicated at 35 in Fig. 3, and the lapped ends are stapled together to firmly secure the windings in position. A commercial stapler is indicated at 36 in Fig. 2. When all four strips are so stapled, the coils are removed from the winding head and formed in curved shape with the use of a forming die including parts 40 and 41, both coils being conveniently formed at the same time. The coils are then ready for application to the motor field laminated core or frame 42, shown in Fig. 6. Inward projections 43 on the frame have curved extremities 44 forming coil receiving slots or recesses. The paper bound portions of the coils are inserted in these recesses and the intermediate portions are then tied to the frame, as by ribbons 45. The field structure is then ready for application to the motor framing in any suitable manner.

The chief advantages of the invention lie in the complete formation of the coil windings before removal from the winding head, in the elimination of the twine ties heretofore provided to hold the windings in place preparatory to insertion in the field core slots, and in the consequent more secure binding of the coils. Furthermore, the staples greatly facilitate insertion of the coils into the small receiving slots and, of course, the previous operation of wedging the ends of the insulating strips between the coil and slot edges is avoided. The invention permits rapid and neat quantity production of the coils. The invention may be modified in various respects as will occur to those skilled in the art and the exclusive use of all modifications as come within the scope of the appended claim is contemplated.

I claim:

The method of forming and applying a motor field coil which consists in applying and temporarily holding strips of flexible insulating material on the surface of a winding spindle, winding the coil over the strips, removing the holding means from the strips, wrapping the strips closely about the overlying windings, tightly drawing together and stapling the overlapping ends of the strips, removing the coil from the spindle and shaping the same to conform with the support, applying the bound portions of the coil to the coil receiving recesses of the support, and tying the unbound portions of the coil to the support.

ALFRED C. KORTE.